(12) United States Patent
Caruso et al.

(10) Patent No.: US 8,360,441 B2
(45) Date of Patent: Jan. 29, 2013

(54) GROCERY CART CUP HOLDER

(76) Inventors: Danny Caruso, Brampton (CA); Scott Muir, Brampton (CA)

( * ) Notice: Subject to any disclaimer, the term of this patent is extended or adjusted under 35 U.S.C. 154(b) by 338 days.

(21) Appl. No.: 12/695,278

(22) Filed: Jan. 28, 2010

(65) Prior Publication Data

US 2011/0181007 A1    Jul. 28, 2011

(51) Int. Cl.
  *B62B 3/18* (2006.01)
(52) U.S. Cl. .............. 280/33.992; 108/26; 224/116; 220/737
(58) Field of Classification Search .......... 280/33.992, 280/33.993; 108/26, 44; 224/161, 585; 220/737
  See application file for complete search history.

(56) References Cited

U.S. PATENT DOCUMENTS

| | | | | |
|---|---|---|---|---|
| 2,766,087 A * | 10/1956 | Marcus | | 108/49 |
| 4,926,758 A * | 5/1990 | Lilly et al. | | 108/43 |
| 5,392,802 A * | 2/1995 | Farr et al. | | 135/66 |
| 5,427,292 A * | 6/1995 | Rousch | | 224/275 |
| D359,862 S * | 7/1995 | Rousch | | D6/406.6 |
| 5,494,306 A | 2/1996 | Adamson | | |
| 5,494,308 A | 2/1996 | Southerland | | |
| 5,531,238 A | 7/1996 | Azzarelli et al. | | |
| D383,284 S | 9/1997 | Lines | | |
| 5,938,091 A | 8/1999 | Bergin | | |
| 6,749,204 B2 * | 6/2004 | Werner | | 280/33.992 |
| 7,661,525 B1 * | 2/2010 | Sandy | | 206/218 |
| 2004/0239059 A1* | 12/2004 | Duchene et al. | | 280/33.993 |
| 2007/0170231 A1* | 7/2007 | DeVine et al. | | 229/117.13 |

* cited by examiner

*Primary Examiner* — John Walters
*Assistant Examiner* — James Triggs
(74) *Attorney, Agent, or Firm* — Kyle Fletcher

(57) ABSTRACT

The grocery cart cup holder a front, middle, and rear frame. The front frame has along an outer end a plurality of front clips, which are used to secure the front frame onto the shopping cart seat frame. The middle frame has at least one circular opening, and is hingedly connected to both the front frame and rear frame. The rear frame has at least one back clip that attaches onto the shopping cart seat frame. The grocery cart cup holder can fold flat to enable use of the grocery cart seat, and the cup holder can fold up to provide a cup holder that consists of the circular opening at an elevated position working in tandem with the grocery cart seat to create a cup holder.

16 Claims, 6 Drawing Sheets

GROCERY CART CUP HOLDER

CROSS REFERENCES TO RELATED APPLICATIONS

Not Applicable

STATEMENT REGARDING FEDERALLY SPONSORED RESEARCH

Not Applicable

REFERENCE TO APPENDIX

Not Applicable

BACKGROUND OF THE INVENTION

A. Field of the Invention

The present invention relates to the field of cup holders, more specifically, a portable cup holder system that works in conjunction with a grocery cart.

A typical grocery cart has a main protrusion for placing groceries therein as well as a seat, which folds out along a side closest to where the handle is located. The seat can fold out and provide a place for holding personal items, such as a handbag or purse, or to support a small child, as in the intended use. When the seat is not being used, the frame can fold up and rearwards to lay flat against a rear wall of the shopping cart.

When shopping there is a need to provide a cup holder such that the shopper may place his or her beverage safety upon said grocery cart without the fear of spilling. The present invention can simply snap upon the shopping cart seat frame, and of which can fold flat when not in use to enable the seat to be used or for the frame to fold flat, or wherein the cup holder frame can fold out to for a cup holder that provides a place to rest at least one cup thereon.

B. Discussion of the Prior Art

As a preliminary note, it should be stated that there is an ample amount of prior art that deals with portable cup holder systems. As will be discussed immediately below, no prior art discloses a foldable storable shopping cart beverage cup holder that clips onto the shopping cart seat, and of which folds flat when not in use so as to not impede use of the seat, and of which folds out to provide at least one cup holder thereon.

The Werner Patent (U.S. Pat. No. 6,749,204) discloses a beverage cup holder for a shopping cart. However, the cup holder is permanently affixed to the shopping cart as opposed to a portable cup holder that clips onto the shopping cart seat, and of which folds out to form a cup holder or that can fold away flat when not in use in order to retain function of the shopping cart seat.

The Adamson et al. Patent (U.S. Pat. No. 5,494,306) discloses an adjustable cup holder for a shopping cart. However, the adjustable cup holder attaches to the handle of the shopping cart as opposed to the shopping cart seat.

The Bergin et al. Patent (U.S. Pat. No. 5,938,091) discloses a cup holder that is mountable on the interior of a supermarket cart and which includes flanges that can be used for directly mounting the cup holder to the cart wall. However, the cup holder attaches onto a wall of the shopping cart as opposed to the shopping cart seat, and of which does not further fold flat when not in use or fold out to provide at least one cup holder when in use.

The Azzarelli et al. Patent (U.S. Pat. No. 5,531,238) discloses a walker caddy container having a cup holder. However, the cup holder is directed to use with a walker caddy and not a shopping cart seat.

The Southerland Patent (U.S. Pat. No. 5,494,308) discloses a shopping cart storage device. However, the storage device hangs from an exterior brace of a shopping cart seat, provides no cup holder thereon, and does not fold flat when not in use.

The Lines Patent (U.S. Pat. No. Des. 383,284) illustrates a design for a shopping cart cup holder, which does not depict a body capable of attaching to the seat of a shopping cart or the ability to fold flat.

While the above-described devices fulfill their respective and particular objects and requirements, they do not describe a foldable storable shopping cart beverage cup holder that clips onto the shopping cart seat, and of which folds flat when not in use so as to not impede use of the seat, and of which folds out to provide at least one cup holder thereon. In this regard, the grocery cart cup holder departs from the conventional concepts and designs of the prior art.

SUMMARY OF THE INVENTION

The grocery cart cup holder a front, middle, and rear frame. The front frame has along an outer end a plurality of front clips, which are used to secure the front frame onto the shopping cart seat frame. The middle frame has at least one circular opening, and is hingedly connected to both the front frame and rear frame. The rear frame has at least one back clip that attaches onto the shopping cart seat frame. The grocery cart cup holder can fold flat to enable use of the grocery cart seat, and the cup holder can fold up to provide a cup holder that consists of the circular opening at an elevated position working in tandem with the grocery cart seat to create a cup holder.

It is an object of the invention to provide a grocery cart cup holder that attaches onto a grocery cart, but can be easily removed there from.

A further object of the invention is to provide a grocery cart cup holder that can fold flat when the grocery cart seat is extended in order for the grocery cart seat to be used either as a place to hold items or as a seat to support a small child.

A further object of the invention is to provide a grocery cart cup holder that can fold up to act as a cup holder by providing an elevated circular opening that works in tandem with the grocery cart seat.

A further object of the invention is to provide a grocery cart cup holder that can also fold up flat vertically so as to enable the grocery cart seat frame to fold up vertically flat against a rear wall of the grocery cart.

Another object of the invention is to provide a grocery cart cup holder that is as easy to use as the grocery cart seat.

These together with additional objects, features and advantages of the grocery cart cup holder will be readily apparent to those of ordinary skill in the art upon reading the following detailed description of presently preferred, but nonetheless illustrative, embodiments of the grocery cart cup holder when taken in conjunction with the accompanying drawings.

In this respect, before explaining the current embodiments of the grocery cart cup holder in detail, it is to be understood that the grocery cart cup holder is not limited in its applications to the details of construction and arrangements of the components set forth in the following description or illustration. Those skilled in the art will appreciate that the concept of this disclosure may be readily utilized as a basis for the design of other structures, methods, and systems for carrying out the several purposes of the grocery cart cup holder.

It is therefore important that the claims be regarded as including such equivalent construction insofar as they do not depart from the spirit and scope of the grocery cart cup holder. It is also to be understood that the phraseology and terminology employed herein are for purposes of description and should not be regarded as limiting.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

In the drawings.

DETAILED DESCRIPTION OF THE EMBODIMENT

Figure 1:
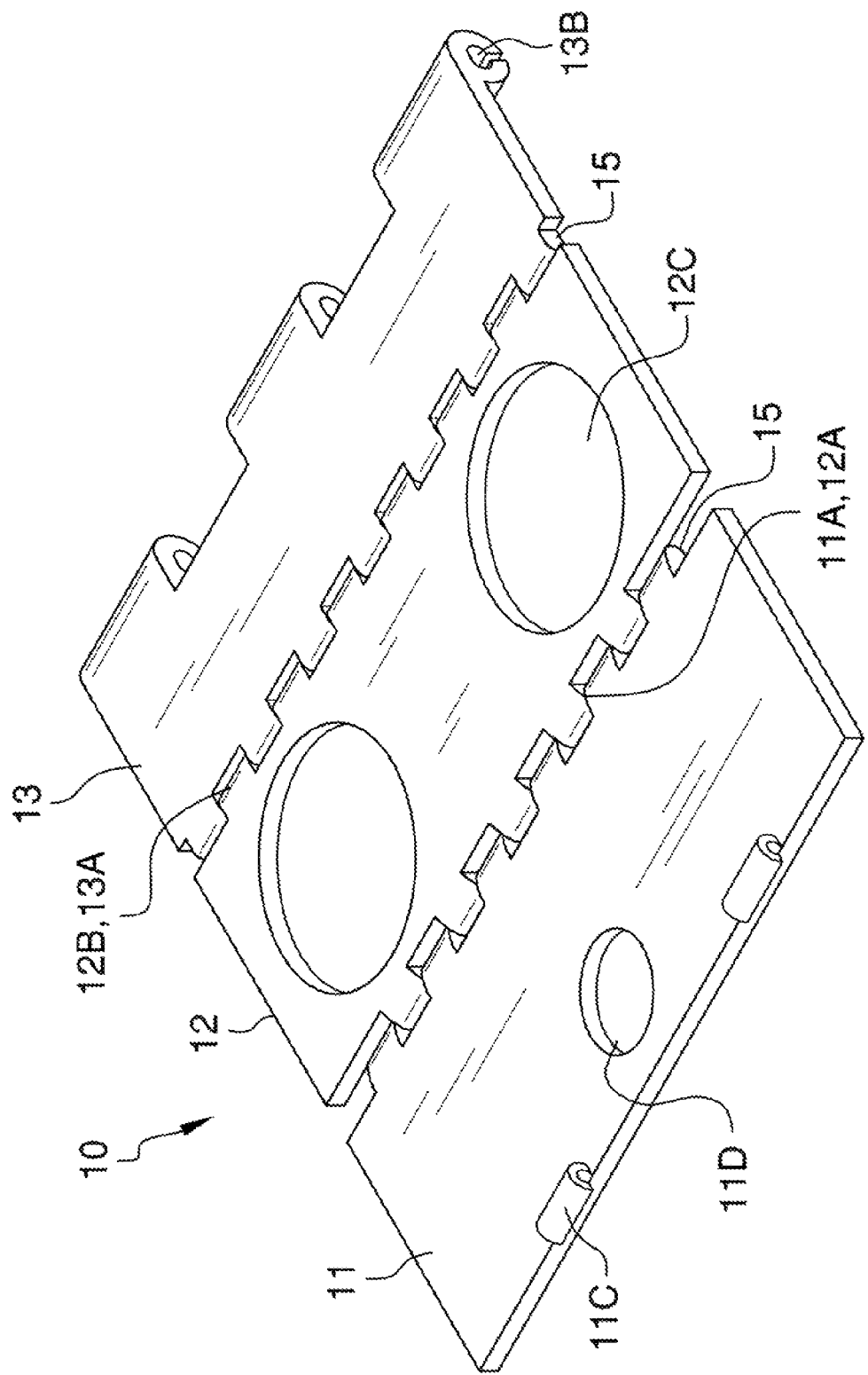
FIG. 1 illustrates a top, perspective view of the grocery cart cup holder by itself and folded flat.

The following detailed description is merely exemplary in nature and is not intended to limit the described embodiments of the application and uses of the described embodiments. As used herein, the word "exemplary" or "illustrative" means "serving as an example, instance, or illustration." Any implementation described herein as "exemplary" or "illustrative" is not necessarily to be construed as preferred or advantageous over other implementations. All of the implementations described below are exemplary implementations provided to enable persons skilled in the art to practice the disclosure and are not intended to limit the scope of the appended claims. Furthermore, there is no intention to be bound by any expressed or implied theory presented in the preceding technical field, background, brief summary or the following detailed description.

Detailed reference will now be made to the preferred embodiment of the present invention, examples of which are illustrated in FIGS. 1-6. A grocery cart cup holder 10 (hereinafter invention) includes a front frame 11, middle frame 12, and rear frame 13.

The front frame 11 connects along an inner end 11A to a front end 12A the middle frame 12 via a hinge 15. The rear frame 13 connects along an inner end 13A to a rear end 12B of the middle frame 12 via a hinge 15.

Figure 5:
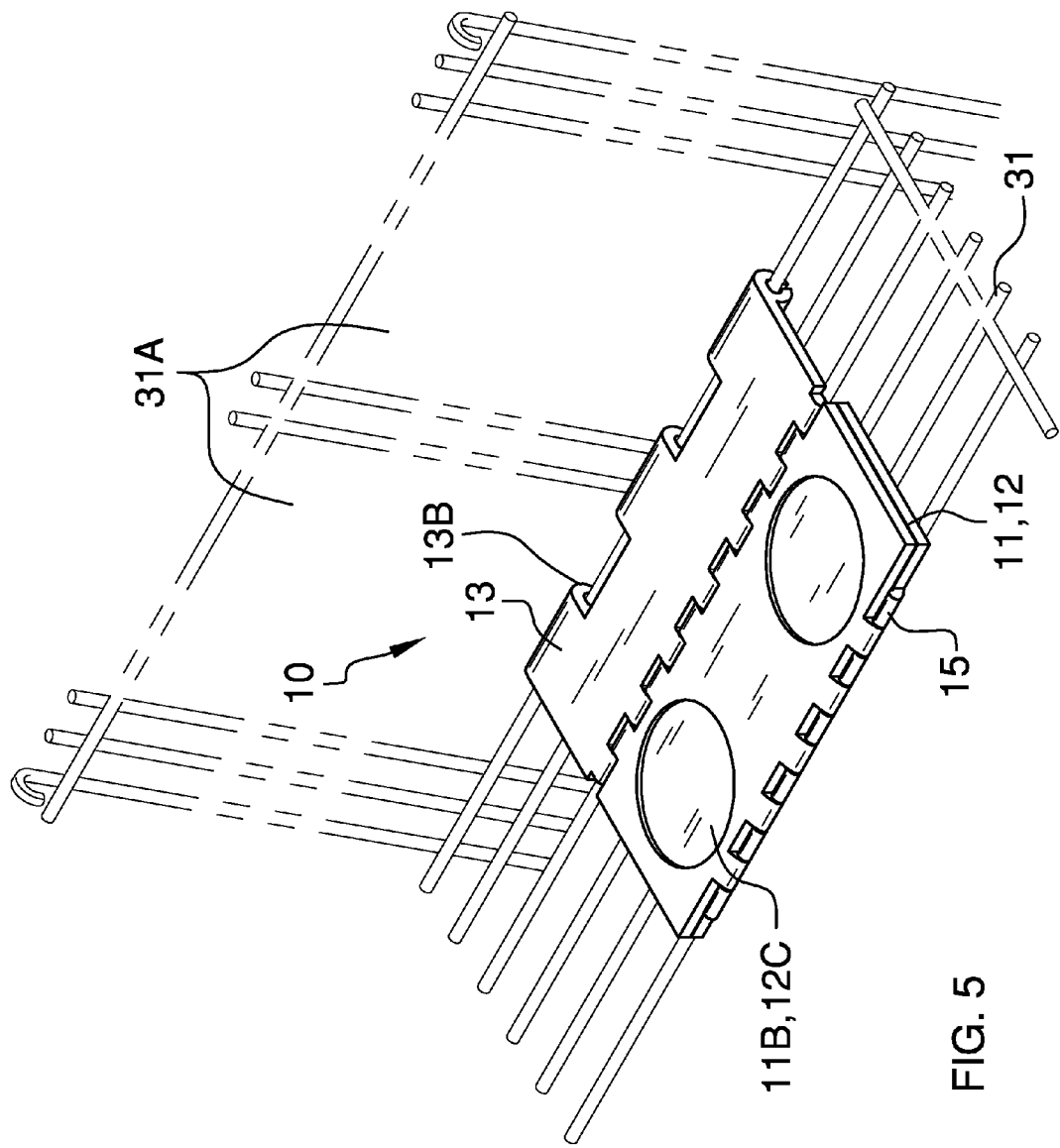
FIG. 5 illustrates a top, perspective view of the grocery cart cup holder attached to a shopping cart seat in a collapsed state wherein the seat can be used.
Figure 6:
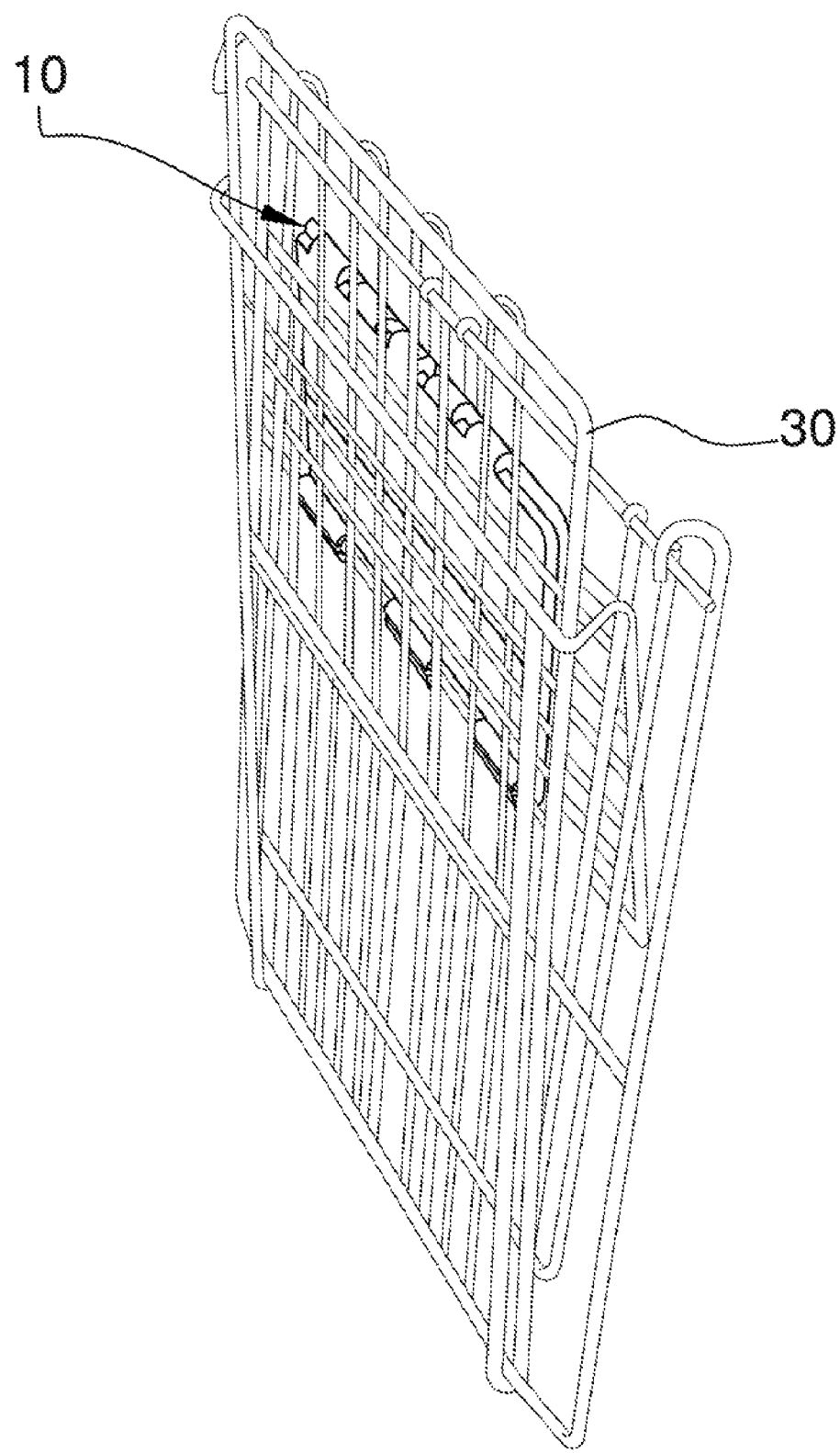
FIG. 6 illustrates a top, perspective view of the grocery cart cup holder attached to a shopping cart seat wherein both the cup holder and seat are folded up vertically and flat against the rear wall of the shopping cart.

The middle frame 12 has at least one circular opening 12C integrated into the design of the middle frame 12. The front frame 11 has at least one cup insert 11B that corresponds with and has an equal amount of in relation to the circular openings 12C of the middle frame 12. The cup insert 11B is designed to snap or fit in place of the respective circular opening 12C such that the front frame 11 is secured to the middle frame 12 in a flattened state as depicted in FIG. 5.

The rear frame 13 has at least one rear clip 13B, which is useful in securing the rear frame 13 to a seat frame 31 of a grocery cart 30. The rear clip 13B has a slot 13B' that enables the rear clip 13B to be snapped onto or unsnapped from the seat frame 31.

Figure 4:
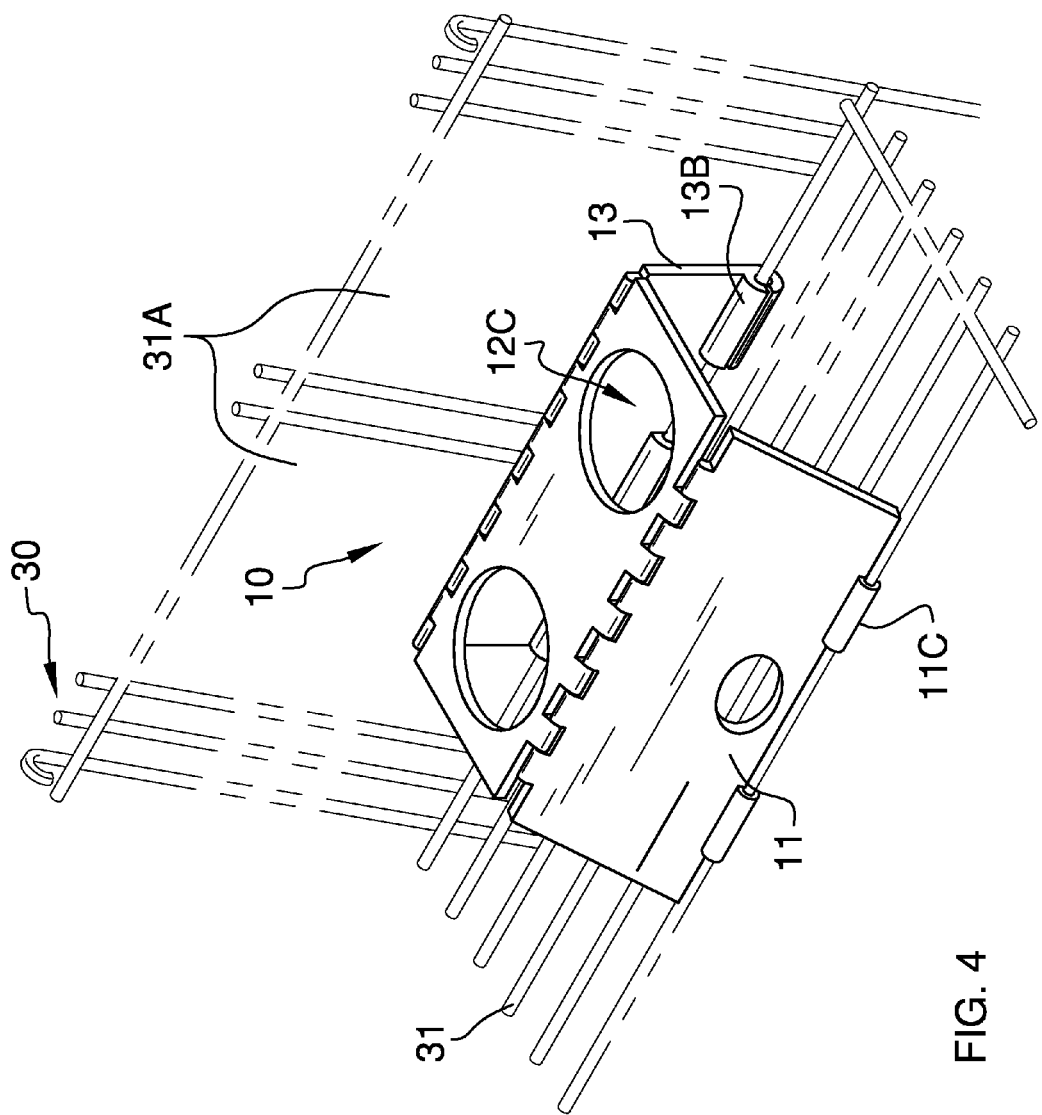
FIG. 4 illustrates a top, perspective view of the grocery cart cup holder attached to a shopping cart seat in an extended state, and depicting the cup holders folded up for use as a cup holder.

The front frame 11 has at least one front clip 11C, which extend vertically from a top surface of the front frame 11. The front clip 11C is used to secure the front frame 11 to the seat frame 31, and angles the front frame to a near vertical orientation as depicted by FIG. 4. Please note that depending upon where the front clip 11C is clipped onto the seat frame 31 relative to the rear clip 13C, will ultimately dictate the angle formed between the front frame 11 and the seat frame 31.

The invention 10 is attached to the grocery cart 30 by clipping the rear clip or clips 13B onto the seat frame 31 at or near where leg openings 31A are provided. Next, the invention 10 is folded depending upon whether the invention 10 is to be used as a cup holder or lay flat to enable the seat frame 31 to be used as a seat.

In the event that the invention 10 is to be used as a cup holder, the front clip or clips 11C snap onto the seat frame 31 opposite where the leg openings 31A are located. Upon connecting the front clip(s) 11C onto the seat frame 31, the circular opening(s) 12C shall be elevated in a horizontal orientation such that the circular opening(s) and the seat frame 31 provide the support necessary to act as a cup holder.

Figure 3:
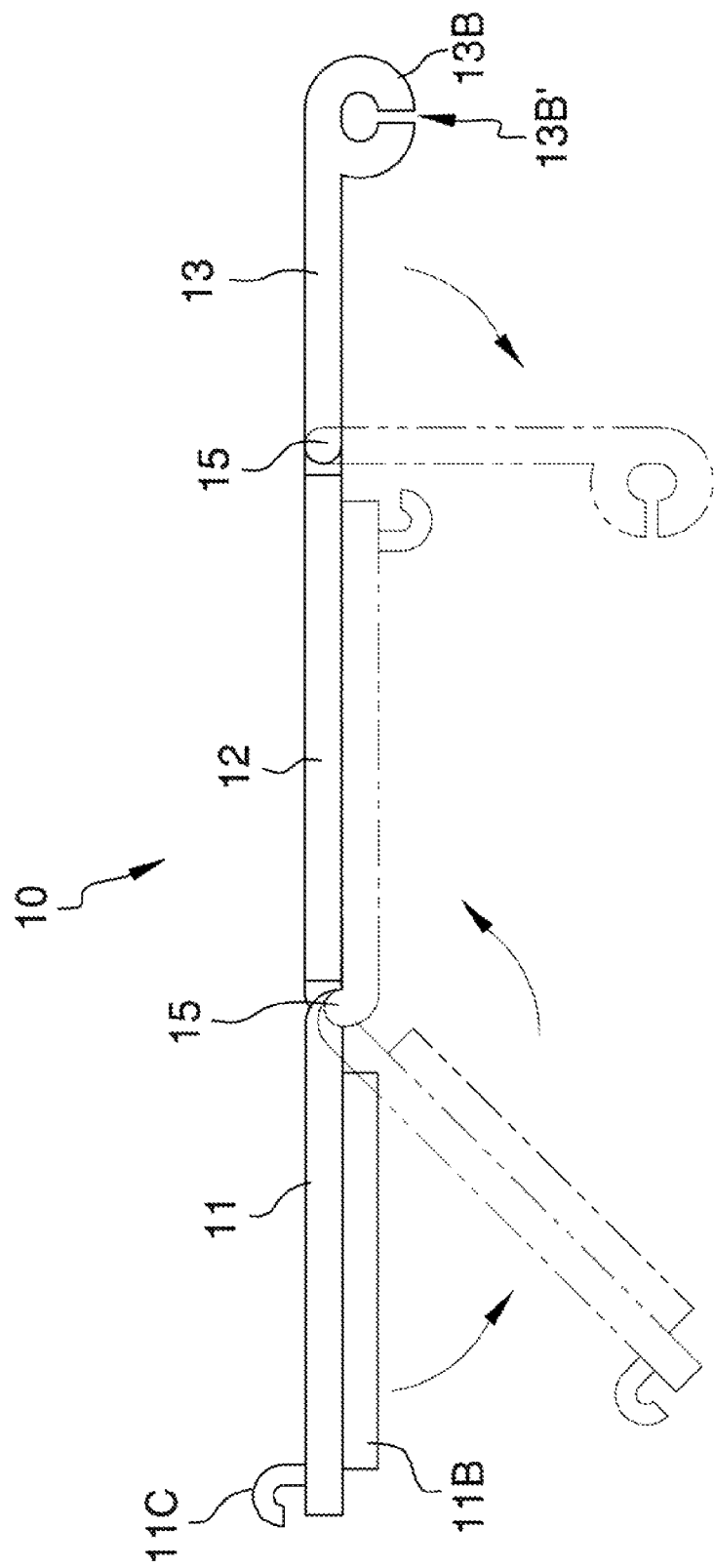
FIG. 3 illustrates a side view of the grocery cart cup holder by itself and folded flat, with dashed lines and rotational arrows depicting rotational movement of the front piece and rear piece to simulate the relative positions during use of the cup holder as a cup holder.

In the event that the invention 10 is to lay flat such that the grocery cart 30 provides a seat for a small child or a place to rest objects, the front clip(s) 11C is (are) disconnected from the seat frame 31. The front frame 11 is folded flat with the middle frame 12, as depicted in FIG. 3, until the cup insert 11B is concentrically engaged with the respective circular opening 12C such that the front frame 11 is secured to the middle frame 12 in a flattened state as depicted in FIG. 5. It shall be noted that the front clip(s) 11C do not clip onto the seat frame 31 when folded in this configuration, and lay in between members of the seat frame 31.

In the event that the invention 10 is to lay flat such that the seat frame 31 is folded flat so that the seat is not extended and that the overall room in the grocery cart 30 is increased, the invention 10 is folded in a manner consistent with FIG. 5. The invention 10 is rotated vertically about the rear clip(s) 13B (see FIG. 6).

The grocery cart cup holder a front, middle, and rear frame. The front frame has along an outer end a plurality of front clips, which are used to secure the front frame onto the shopping cart seat frame. The middle frame has at least one circular opening, and is hingedly connected to both the front frame and rear frame. The rear frame has at least one back clip that attaches onto the shopping cart seat frame. The grocery cart cup holder can fold flat to enable use of the grocery cart seat, and the cup holder can fold up to provide a cup holder that consists of the circular opening at an elevated position working in tandem with the grocery cart seat to create a cup holder.

The front frame 11, middle frame 12, rear frame 13, front clip(s) 11C, and rear clip(s) 13B are made of a material comprising a plastic, carbon fiber composite, metal, rubber, or wood. It is also envisioned that the invention 10 be made of recycled materials such as cardboard, which would simply require that the hinges mentioned above comprise of a crease between the respective parts enabling the parts to bend or rotate about said crease.

Figure 2:
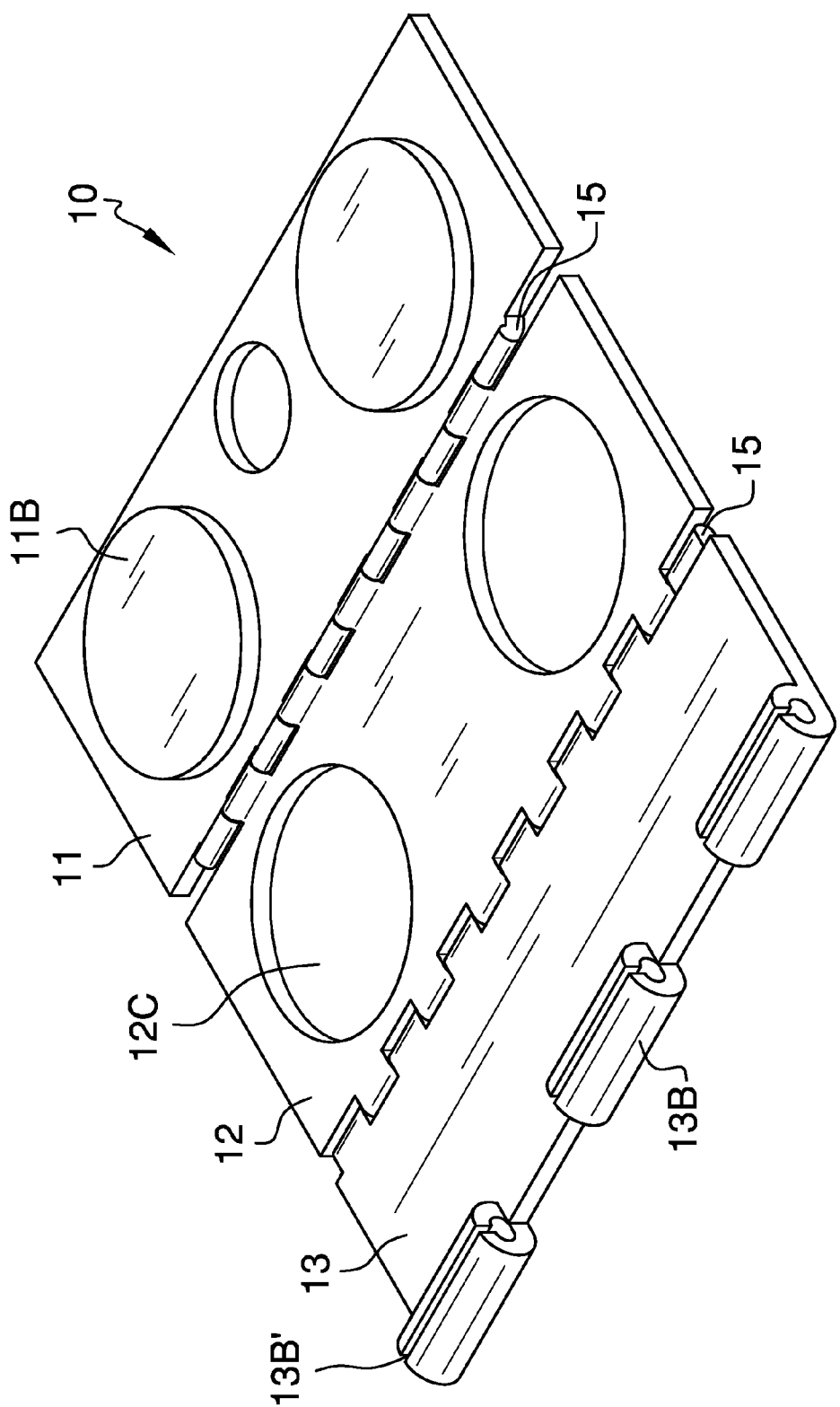
FIG. 2 illustrates a bottom, perspective view of the grocery cart cup holder by itself and folded flat, and detailing the cup inserts.

Referring to FIGS. 1, 2, and 4, a thumbhole 11D has been included to provide leverage for the removal and installation of the invention 10 from and onto the grocery cart 30. It shall be noted that the thumbhole 11D is included on the front frame 11. However, it shall be noted that the thumbhole 11D may be added onto the rear frame 13 in addition to or as a replacement of the thumbhole 11D of the front frame 11.

With respect to the above description, it is to be realized that the optimum dimensional relationship for the various components of the invention 10, to include variations in size, materials, shape, form, function, and the manner of operation, assembly and use, are deemed readily apparent and obvious to one skilled in the art, and all equivalent relationships to those illustrated in the drawings and described in the specification are intended to be encompassed by the invention 10.

It shall be noted that those skilled in the art will readily recognize numerous adaptations and modifications which can be made to the various embodiments of the present invention which will result in an improved invention, yet all of which will fall within the spirit and scope of the present invention as defined in the following claims. Accordingly, the invention is to be limited only by the scope of the following claims and their equivalents.

The invention claimed is:

1. A grocery cart cup holder comprising:
a front frame connected to a middle frame, and wherein said middle frame connects to a rear frame;
wherein the middle frame has at least one circular opening;
wherein the rear frame has at least one rear clip used to secure the rear frame to a seat frame of a grocery cart, and enables the front, middle, and rear frame to rotate about said seat frame;
wherein the front frame has at least one front clip used to secure the front frame to a seat frame of a grocery cart;
wherein both clips are secured to the seat frame such that the circular opening is at an elevated, horizontal orientation and working in conjunction with said seat frame to form a cup holder;
wherein the front frame connect to the middle frame via a hinge;
wherein the middle frame connects to the rear frame via a hinge;
wherein the front frame has at least one cup insert that fits in place of the respective circular opening such that the front frame is secured to the middle frame in a flattened state;
wherein the front clip extends vertically from a top surface of the front frame.

2. The grocery cart cup holder as described in claim 1 wherein the front frame has a plurality of cup inserts whereas the middle frame has a plurality of circular openings.

3. The grocery cart cup holder as described in claim 1 wherein the front clip is disconnected from the seat frame; wherein the front frame is folded under the middle frame having the cup insert fitted within the circular openings; wherein the rear frame along with both the middle frame and front frame are laid flat upon the seat frame when the cup holder is not in use.

4. The grocery cart cup holder as described in claim 3 wherein the rear frame and both the front frame and middle frame, being secured together via the cup insert and circular opening, are rotated vertically while the seat frame is retracted against said grocery cart thereby expanding the available room in said grocery cart.

5. The grocery cart cup holder as described in claim 1 wherein the front frame, middle frame, rear frame, front clip, and rear clip are made of a material comprising a plastic, carbon fiber composite, metal, rubber, or wood.

6. The grocery cart cup holder as described in claim 1 wherein a thumbhole is included on the front frame for use in providing leverage for attachment of or removal of the grocery cart cup holder from a grocery cart.

7. The grocery cart cup holder as described in claim 1 wherein a thumbhole is included on the rear frame for use in providing leverage for attachment of or removal of the grocery cart cup holder from a grocery cart.

8. A grocery cart cup holder comprising:
a front frame connected to a middle frame, and wherein said middle frame connects to a rear frame;
wherein the middle frame has at least one circular opening;
wherein the rear frame has at least one rear clip used to secure the rear frame to a seat frame of a grocery cart, and enables the front, middle, and rear frame to rotate about said seat frame;
wherein the front frame has at least one front clip used to secure the front frame to a seat frame of a grocery cart;
wherein both clips are secured to the seat frame such that the circular opening is at an elevated, horizontal orientation and working in conjunction with said seat frame to form a cup holder;
wherein the front frame has at least one cup insert that fits in place of the respective circular opening such that the front frame is secured to the middle frame in a flattened state.

9. The grocery cart cup holder as described in claim 8 wherein the front frame connects to the middle frame via a hinge.

10. The grocery cart cup holder as described in claim 8 wherein the middle frame connects to the rear frame via a hinge.

11. The grocery cart cup holder as described in claim 8 wherein the front frame has a plurality of cup inserts whereas the middle frame has a plurality of circular openings.

12. The grocery cart cup holder as described in claim 8 wherein the front clip extends vertically from a top surface of the front frame.

13. The grocery cart cup holder as described in claim 8 wherein the front clip is disconnected from the seat frame; wherein the front frame is folded under the middle frame having the cup insert fitted within the circular openings; wherein the rear frame along with both the middle frame and front frame are laid flat upon the seat frame when the cup holder is not in use.

14. The grocery cart cup holder as described in claim 13 wherein the rear frame and both the front frame and middle frame, being secured together via the cup insert and circular opening, are rotated vertically while the seat frame is retracted against said grocery cart thereby expanding the available room in said grocery cart.

15. The grocery cart cup holder as described in claim 8 wherein the front frame, middle frame, rear frame, front clip, and rear clip are made of a material comprising a plastic, carbon fiber composite, metal, rubber, or wood.

16. The grocery cart cup holder as described in claim 8 wherein a thumbhole is included on the front frame for use in providing leverage for attachment of or removal of the grocery cart cup holder from a grocery cart.

* * * * *